Aug. 27, 1940.  R. F. DE BOER ET AL  2,212,977
LID BRACE
Filed Sept. 15, 1937   2 Sheets-Sheet 1

Inventors
Rudolph F. DeBoer
Edward Gillisse
James Leroy Flora
By Livernane and Van Antwerp
Attorneys Inventors
Rudolph F. DeBoer
Edward Gillisse
James Leroy Flora
Attorneys Patented Aug. 27, 1940

2,212,977

UNITED STATES PATENT OFFICE 2,212,977

LID BRACE

Rudolph F. De Boer, Edward Gillisse, and James Leroy Flora, Grand Rapids, Mich., assignors to Applied Arts Corporation, Grand Rapids, Mich., a corporation of Michigan Application September 15, 1937, Serial No. 163,940

9 Claims. (Cl. 217—60)

This invention relates to a brace adapted to hold a hinged cover or lid in open position. In the present invention the brace is of a folding type and is especially designed to support a hinged trunk cover or the hinged cover of the rear luggage compartment of an automobile. However, the brace may be used in many other different relations or in any place where a supporting or holding brace of the character to be described is usable.

An object of the invention is to provide a brace which when extended to support the lid or cover will not accidentally fold and permit the cover to drop, and which, in the operation of lifting the cover or lid is sure and certain in its action. With our invention when the cover is moved to open position and the brace is straightened out to bracing position it automatically locks and cannot be folded until the cover is moved upwardly to thereby extend the parts of the brace and unlock the joint between said parts, whereupon a downward movement of the cover will automatically cause the brace to fold and permit the cover to take its closed position.

A further object of the invention is to provide a brace of the character stated which is strong and durable, easily manufactured and assembled, is capable of withstanding severe use and which may be installed in conjunction with the body of an automobile and the cover or lid of a trunk or luggage space without any particular nicety in positioning and attaching the parts of the brace to said automobile body and cover, all of which will be hereafter more fully described.

An understanding of the invention may be had from the following description, taken in connection with the accompanying drawings, in which, Fig. 1 is a sectional and somewhat diagrammatic view of the rear part of an automobile showing the brace employed in conjunction with the cover or lid for the rear luggage compartment of an automobile.

Like reference characters refer to like parts in the dfferent figures of the drawings.

Figure 1:
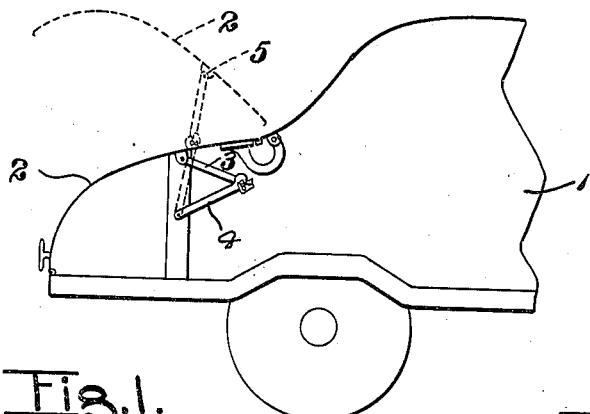
Figure 2:
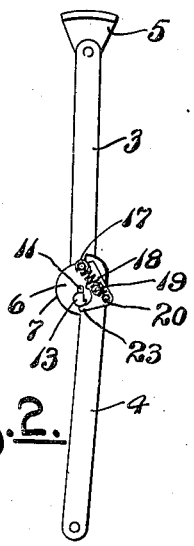
Fig. 2 is a side elevation of the brace straightened out into its operative and locked holding position.

The rear part of an automobile body indicated at 1 is shown as having a hinged cover 2 over the luggage compartment which may be lifted to the dotted line position shown for access to said compartment. The brace includes what may be termed an upper bar 3 and a lower bar 4 jointed together at their adjacent ends and adapted to be attached respectively to the lid and to the body, the upper end of the upper bar 3 having a pivoted connection to a bracket 5 which is secured to the underside of the lid or cover 2 and the lower end of the lower bar 4 pivotally connected to the body of the automobile. While the illustration in Fig. 1 shows the invention applied to the luggage compartment cover in an automobile body of the coupe type, it is evident that the same brace is adapted to be used in conjunction with the trunk and the trunk cover or lid in automobile bodies of the sedan or coach type; and while the bar 3 has been shown as attached to the lid 2 and bar 4 to the body, the position of the brace may be reversed so that the lower bar 4 may be the upper bar and the upper bar 3 the lower bar, the operation not being affected. It is also immaterial at what particular location the brace is connected to the lid or cover and the body, as the brace functions when it is pulled to a substantially straight position and it is only necessary to have the proportions and points of attachment such that when the brace is straightened out to the position shown in Fig. 2 the cover will have been opened to the desired extent.

Figures 3, 4, 5:
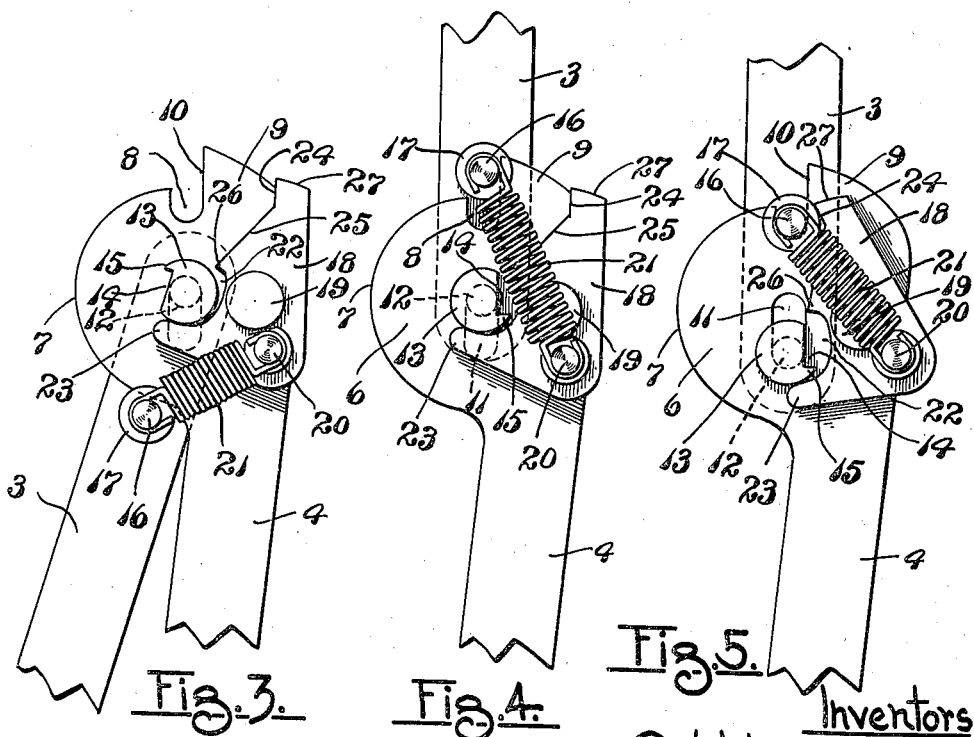
Fig. 3 is a fragmentary enlarged elevation of the brace illustrating the same in the position which it takes when folded.
Fig. 4 is a similar view of the joint of the brace when the cover has been lifted to extreme upper position and immediately prior to the locking of the brace.
Fig. 5 is a view similar to Fig. 4 showing the completion of the movement by means of which the two brace parts are locked against folding at the jointed connection thereof.

The end of the bar 4 which is connected with the adjacent end of the bar 3 is enlarged laterally as indicated at 6 into arc-shape or substantially semi-circular form having a curved edge 7 which at its upper side joins with a short downwardly extending slot 8 as shown. A projection extends above the upper part of the curved edge 7 at the opposite side of slot 8 and one side 10 thereof provides a side of the slot 8 extending above the upper end of the slot. A vertical slot 11 is made in the enlarged portion 6. The bars 3 and 4 are pivotally joined together by a pin 12 which passes through the slot 11, and at the end where the pin passes through the bar 3 it is preferably square in cross section so that the pivot pin must turn with the bar 3. When the pivot pin 12 is substantially at the upper end of the slot 11, the arc-shaped edge 7 is substantially the arc of a circle the center of which is the axis of the pin 12, as shown in Fig. 4.

The pin 12 is equipped with a disk-like head 13 which lies along the outer side of the enlarged portion 6. Said disk at one side is recessed, as at 14, the recess having sides at right angles to each other and so located with respect to the pin that when the brace is in its straight unfolded position the longer side of the recess is substantially vertical and the shorter side horizontal as in Fig. 4, thereby providing a projecting lip 15 on the head 13 as shown in Figs. 3, 4 and 5.

A pin 16 is connected with the brace 3 and between its ends has a collar 17 of larger diameter, the inner side of which is spaced from the bar 3 a distance slightly greater than the thickness of the bar 4. The pin 16 is so located that when the pivot pin 12 is a short distance below the upper end of the slot 11 the pin rides upon the curved edge 7 of the enlarged part 6 of bar 4.

An irregularly shaped dog 18 similar to a bell crank is pivotally mounted on a pivot pin 19 on the bar 4 to one side of the slot 11. A pin 20 projects from the angle or elbow portion of the dog 18 and between it and the free end of pin 16 a coiled tension spring 21 is installed. At the edge of the dog adjacent the notched or recessed disk 13 a recess 22 is made in the dog below which is a projecting finger 23 which extends below the head 13. At the opposite and upper end of the dog and at its inner edge is a short shoulder 24 from which an edge 25 extends downwardly at an angle providing a tooth 26 at its juncture with the upper end of the recess 22. The upper end of the dog has an arc-shaped surface 27 the radius of curvature of which extends therefrom to the axis of the pivot pin 19.

Figure 9:
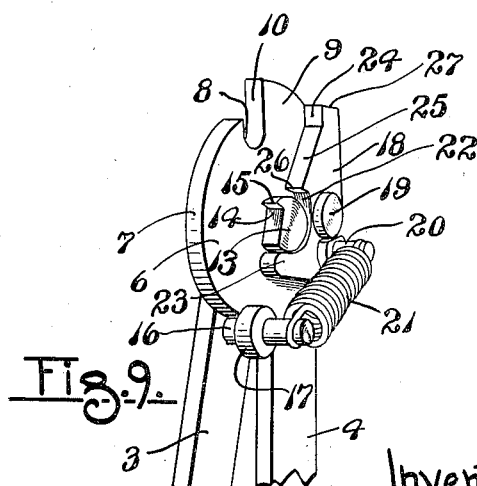
Fig. 9 is a perspective view of the folded brace joint when the lid or cover is in closed position.

When the lid or cover is closed the parts take the position shown in either Figs. 3 or 9. The spring 21 is under tension and the force of the spring tends to turn the dog 18 in a clockwise direction bringing the finger 23 against the underside of the head 13. When the lid or cover is raised the arm 3 turns about the axis of the pin 12, the pin 16 riding against the curved edge 7 until it comes to the upper end of the slot 8, or to the position shown in Fig. 4. The recessed head 13 turns with the brace bar 3 and the pin comes against the shoulder or edge 10 of the part 9, stopping the movement of the bar 3, and is thereupon in a position for the pin to move downwardly into slot 8.

In this position the brace is designed so that the pivotal connection by the pin 12 of the two bars and the respective pivotal connection of the bars with the body and the lid are in alinement, or in other words, the brace has become straightened as far as possible which limits the opening movement of the lid. When the weight of the lid is released it will cause the pin 16 to enter the slot 8 which locks the parts in alined position and prevents them from folding.

At the same time the pin 16 enters the slot 8 the pin 12 travels downwardly in the slot 11 and a head 13 pushes on the finger 23 moving the dog 18 about its pivot to the position shown in Fig. 5 wherein the shoulder 24 engages the collar 17 of the pin 16. During this swinging movement of the dog 18 the axis of the spring 21 has been swung past the axis of the pivot 19 of the dog and exerts its power to move the end 27 of the dog toward the pin 16.

It will be noted that when the parts of the brace are extended as shown in Figs. 4 and 5 the spring 21 has a tendency to move the pin 16 downwardly into the slot 8 and also tends to hold the pin 16 against the shoulder 10. In other words, the tendency of this spring is to retain the parts in straight line position and to move the pin 16 into the slot to locked position. This action of the spring obviates any tendency on the parts to fold when the weight of the lid is released and exerted against the brace so that there is no possibility of the parts failing to become locked when the lid is released.

In such position of the brace it is locked securely against folding movement. The spring 21 which is stretched in the unfolding of the brace is still stretched to a considerable degree when the pin 11 has entered the slot 8, holding such pin in the slot against accidental movement. The brace can be unlocked only by bodily upward movement of the bar 3. In such operative position of the brace wherein it holds the cover in open position a straight line may be drawn through the axis of the pin 12 and of the end pivots of the bars 3 and 4 where they are connected, respectively, to the cover or lid and the automobile body. Any downward pressure on the cover or lid is transmitted as a straight line pressure through the several pivots and such pressure has no appreciable effect tending to fold the brace. It will further be noted that in the change of position of the dog 18 from that shown in Fig. 4 to that shown in Fig. 5, the line of force of the spring 21 has crossed the pivotal axis of the pivot 19 so that while the spring tends to turn the dog in a clockwise direction in Fig. 4, it tends to turn it in the opposite or counterclockwise direction in Fig. 5.

Figure 6:
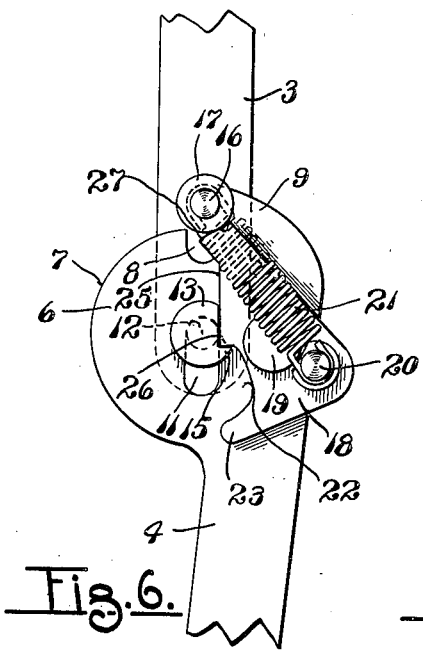
Fig. 6 is a like view similar to Figs. 4 and 5 illustrating the position of the parts of the brace upon the initiation of the closing movement of the cover or lid to which it is applied, the lid having been lifted to unlock the joint preparatory for folding movement.

To unlock the brace and lower the cover or lid it is necessary merely to grasp the free rear edge of the lid 2 and lift it upwardly, whereupon the bar 33 is elevated carrying the pin 16 with it and raising the pivot pin 12 to the upper end of the slot 11 as in Fig. 6. At this extreme position of the bar 3 the collar 17 is carried high enough that the dog 18 may turn farther in a counterclockwise direction and bring the upper end surface 27 thereof underneath the collar so that should the cover then be released, the brace will not again assume a locked position being held in unlocked position, as in Fig. 6, by the dog 18. With this movement of the dog 18 the tooth at 26 enters the recess 14 of the head 13 and at its lower side bears against the upper side of the projection 15. This then transfers momentarily the point of pivotal movement of the joint of the brace from the pin 12 to pin 19, so that there is a broken toggle in effect produced from the pivot of the upper end of the bar 3 to the axis of the pivot 19 and thence to the pivot at the lower end of the bar 4. The pressure of the weight of the lid under such conditions causes the bar 3 to turn about the axis of the pin 19 and thereby carry the pin 16 from a position directly above the slot 8 over to the curved edge 7 of the enlarged part 6 during which it rests on the upper end surface of dog 18. At the time the pivot pin 12 between the bars 3 and 4 drops a short distance in the slot 11, the head 13 turns with the turning movement of the bar 3 and with a continued downward movement of the cover or lid with which the brace is associated, the projection 15 turning in a counterclockwise direction acts to turn the dog 18 in a clockwise direction about its pivot 19, moving the upper end of the dog away from the pin 16 which continues to ride upon the edge 7 against the bars. This continued movement is illustrated in Fig. 8 and continues until the brace is fully folded or is in the position shown in Figs. 3 or 9.

Figure 7:
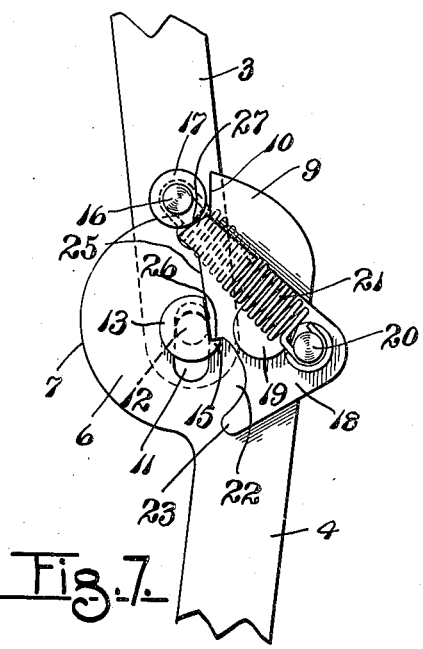
Fig. 7 is a similar view showing the immediately succeeding movement and the position which the parts of the brace take upon starting downward movement of the lid or cover after it has been previously lifted.
Figure 8:
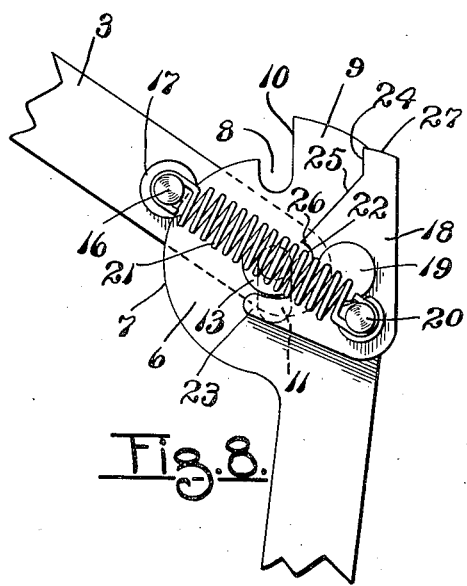
Fig. 8 is a similar view showing the brace in the act of being folded to lower the lid or cover to closed position.

It will be evident that with the parts shown in Fig. 7 and with the brace bar 3 at the initiation of its folding movement the snapping of the dog 18 from the position shown in Fig. 7 where it engages with the collar 17 on pin 16 to its extreme other position, as in Fig. 8, occurs earlier than it would otherwise because of the positive movement imparted to the dog by the turning of the head 13. When the dog has moved from the position of Fig. 7 to that of Fig. 8, this occurring when the lid or cover 2 has been lowered but a short distance, if for any reason it is desired to return the lid or cover to its upper open position it may be done without closing the cover, it not being necessary to lower the lid to fully closed position as is true in many other types of trunk or luggage cover braces, before again fully opening it.

This construction of folding brace is one which may be very readily produced in quantity and at low cost. Its operation is sure and positive. The brace automatically locks when it is drawn to position the pivotal means of the bars in a straight line in which position there is no tendency of the brace to fold from any pressure which may be placed upon the lid or cover. Furthermore, in the operation of operating the lid the riding of the pin 16 on the curved edge 7 can put the pivot pin 12 in a position such that the upper end of the dog 18 cannot come underneath the collar 17 and there is insurance of a positive locking of the brace by the entry of the pin 16 into the slot 8, no matter under what conditions the lid may be lifted, whether lifted relatively slowly and quietly or jerked upward with considerable violence.

The construction is very practical and useful and has so proved in practical and commercial use. The invention is defined in the appended claims and is to be considered comprehensive of all forms of structure coming within their scope.

We claim:

1. A brace comprising two elongated members, one of said members having a slot therein and a recess at an edge thereof, a pivot pin in the opposite member extending through said slot whereby the members are pivotally and movably connected together, a second pin on said opposite member adapted to enter said recess when the members are open and in substantial alinement thereby locking said members against pivotal movement, a dog mounted on the slotted member, and a spring connected to said dog and so arranged that the dog will engage under said last mentioned pin when said members are longitudinally moved to disengage the pin from the recess and carry the pin away from said recess on initiation of folding movement of said members with respect to each other.

2. A jointed brace comprising two members, the first of said members having a lateral enlargement with a curved edge with a slot in the body of said enlargement and a recess in the curved edge in substantial alinement with said slot, a pivot pin carried by the second member extending through said slot, a second pin carried by the second member adapted to be moved into conjunction with said recess and be received therein to lock the members against folding when in substantial alinement with each other, a head on the pivot pin having a recess in one side, a dog pivotally mounted on the first member recessed at one side for the reception of the adjacent side of said head and having a finger extending alongside of said head at one side of the recess and a spring connected with the dog and with the second of said pins said dog above the recess therein having a tooth adapted to be received in the recess of said head on the pivot pin, substantially as and for the purposes described.

3. A brace of the class described comprising, an elongated flat bar having a laterally extending enlargement at its upper end, said enlargement having an edge curved in the arc of a circle and also having a vertical slot therein, a second elongated bar, a pivot pin fixed thereon extending through said slot, the axis of said pivot pin when said pin is substantially at the upper end of said slot coinciding with the center of said arc-shaped edge of said enlargement, said enlargement above said slot having a vertical recess therein, a second pin connected to the second mentioned bar and adapted to ride upon the curved edge of said enlargement to said recess, a dog pivotally mounted on the first bar at one side of the slot therein, a third pin extending from the dog, a coiled tension spring connected at its ends to the second and third mentioned pins, a circular head on the pivot pin in the same vertical plane with said dog and having a recess in one side, said dog being recessed in its adjacent side having a finger extending below said head and a projection extending above the recess in said head, the location of the pin on the dog being such that upon longitudinal movement of said bars to seat said second pin in said recess in the enlargement on the first bar, said head engaging the finger on the dog turns said dog to a position whereby on longitudinal movement of the bars to disengage the second pin from the recess the upper end of the dog interposes in the path of movement of said second pin and prevents its reentry into the recess.

4. A brace comprising two bars pivotally and longitudinally movably connected together at adjacent ends, one of said bars having a pin receiving recess therein, a pin on the second of said bars adapted to enter said recess when the bars are open and in substantial alinement to lock said bars against relative movement, said pin being drawn out of said recess on longitudinal movement of the bars in the opposite direction, means mounted on the first of said bars normally held at an inoperative position when the bars are moved from folded to locked position, and means on the other of said bars adapted to move said first mentioned means into a position beneath said pin to prevent the reentry of the pin into the recess after it has been withdrawn therefrom.

5. In combination, a receptacle open at its upper side, a cover hinged thereto at one edge to close the open upper side of the receptacle, a folding brace between said receptacle and cover including two bars, the upper end of one of said bars being pivotally connected to the lid and the lower end of the other bar pivotally connected to the receptacle, one of said bars having a slot and the other of said bars having a pivot pin passing through said slot at the adjacent ends of the bars and said slotted bar also having a pin receiving recess in an edge thereof, a second pin on the other bar adapted to enter said recess when the lid has been lifted to move said bars into substantial alinement with each other, a pivotally mounted dog on said slotted bar, spring means acting on said dog, and means on said pivot pin acting on said dog to turn the same to a position when said second pin enters said recess whereby the spring will draw the dog into position with reference to said pin receiving recess such that upon longitudinal movement of said bars with respect to each other on lifting the lid said second pin is held from reentry into said recess, and said lid thereupon must be lowered and cannot again be relocked in open position until after it has been lowered a predetermined distance.

6. A brace comprising two elongated members pivotally and slidably connected together, one of said members having a recess therein, a pin on the other member adapted to enter said recess when said members are open and in substantial alinement to lock said members against relative movement, a dog pivotally mounted on said recessed member, and spring means connecting said dog with said pin and so arranged that a portion of said dog will be moved beneath said pin after its removal from the recess to maintain said members in unlocked relation.

7. The combination of elements defined in claim 6, combined with a lateral enlargement on said recessed member adapted to constantly engage said pin during the opening and closing movements of said members, for the purpose described.

8. A brace comprising two bars one having a slot at one end thereof and the other having a pin thereon passing through said slot whereby the bars are pivotally connected together and have a limited movement with respect to each other within the limits prescribed by said pivot pin and slot, said slotted bar also having a pin receiving recess at an edge thereof, a second pin on the second bar adapted to enter said recess to lock the bars against folding movement when the same are open and in substantial alinement, a member pivotally mounted on the first bar adapted to have operative and inoperative positions, its operative position being under said second pin after the removal of said pin from said recess to prevent its reentry thereinto, and its inoperative position being such as to permit the entry of said second pin into the recess, and spring means so arranged with respect to said member as to hold same in either its operative or inoperative position.

9. A brace comprising two bars pivotally connected and movable longitudinally with respect to each other, a laterally enlarged portion at one end of one of said bars having a recess therein, a pin attached to and extending from the other of said bars adapted to be moved into said recess to prevent relative movement of said bars, means to maintain said pin in contact with the edge of said enlarged portion during movement to and from said recess, a lever pivotally mounted on one of said bars, and spring means coacting with said lever and so arranged that the lever will be moved under said pin upon its removal from said recess to prevent its reentry thereinto, for the purposes described.

RUDOLPH F. DE BOER.
EDWARD GILLISSE.
JAMES LEROY FLORA.